(12) United States Patent
Kim et al.

(10) Patent No.: US 11,426,878 B2
(45) Date of Patent: Aug. 30, 2022

(54) METHOD FOR CONTROLLING ROBOT BASED ON BRAIN-COMPUTER INTERFACE AND APPARATUS FOR CONTROLLING MEAL ASSISTANCE ROBOT THEREOF

(71) Applicant: KOREA INSTITUTE OF SCIENCE AND TECHNOLOGY, Seoul (KR)

(72) Inventors: Laehyun Kim, Seoul (KR); Da-Hye Kim, Seoul (KR); Seul Kee Kim, Seoul (KR); Ju-Suk Yun, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 424 days.

(21) Appl. No.: 16/683,687

(22) Filed: Nov. 14, 2019

(65) Prior Publication Data

US 2021/0107162 A1  Apr. 15, 2021

(30) Foreign Application Priority Data

Oct. 10, 2019 (KR) .................. 10-2019-0125171

(51) Int. Cl.
*B25J 9/00* (2006.01)
*B25J 11/00* (2006.01)
(Continued)

(52) U.S. Cl.
CPC ........... *B25J 11/008* (2013.01); *B25J 9/0003* (2013.01); *B25J 9/1694* (2013.01); *B25J 13/087* (2013.01);
(Continued)

(58) Field of Classification Search
CPC ...... B25J 11/008; B25J 13/087; B25J 9/1694; B25J 9/0003; G02B 27/017; G06F 3/017; G06F 3/0482; G06F 3/015; G06T 19/006
(Continued)

(56) References Cited

U.S. PATENT DOCUMENTS 9,743,002 B2 * 8/2017 Wierich ................. H04N 7/181
2016/0103484 A1 * 4/2016 Guo ....................... G06V 40/19
345/156

(Continued)

FOREIGN PATENT DOCUMENTS

JP   2013544546 A   12/2013
KR   101314570 B1   10/2013

OTHER PUBLICATIONS

Tae Wan Eum et al., "EEG-based Brain Computer Interface Technology", Communications of the Korean Institute of Information Scientists and Engineers, vol. 22, No. 2, pp. 5-19, 2004.

*Primary Examiner* — Dalena Tran
(74) *Attorney, Agent, or Firm* — Rabin & Berdo, P.C.

(57) ABSTRACT

The present disclosure relates to technology that controls a robot based on brain-computer interface, and a robot control method acquires a first biosignal indicating an intention to start the operation of the robot from a user to operate the robot, provides the user with visual stimulation of differently set signal cycles corresponding to a plurality of objects for which the robot executes motions, acquires a second biosignal evoked by the visual stimulation from the user to identify an object selected by the user, and acquires a third biosignal corresponding to a motion for the identified object from the user to induce the robot to execute the corresponding motion.

20 Claims, 9 Drawing Sheets

(51) Int. Cl.
  *B25J 13/08*  (2006.01)
  *B25J 9/16*  (2006.01)
  *G02B 27/01*  (2006.01)
  *G06F 3/01*  (2006.01)
  *G06F 3/0482*  (2013.01)
  *G06T 19/00*  (2011.01)

(52) U.S. Cl.
  CPC ........... *G02B 27/017* (2013.01); *G06F 3/015* (2013.01); *G06F 3/017* (2013.01); *G06F 3/0482* (2013.01); *G06T 19/006* (2013.01)

(58) Field of Classification Search
  USPC .......................... 700/245; 715/702, 701, 740
  See application file for complete search history.

(56) References Cited

U.S. PATENT DOCUMENTS

| | | | | |
|---|---|---|---|---|
| 2017/0078447 A1* | 3/2017 | Hancock | ............ | H04N 21/4424 |
| 2017/0124928 A1* | 5/2017 | Edwin | ................ | H04N 13/344 |
| 2017/0290504 A1* | 10/2017 | Khaderi | ................ | G16H 50/20 |

* cited by examiner

METHOD FOR CONTROLLING ROBOT BASED ON BRAIN-COMPUTER INTERFACE AND APPARATUS FOR CONTROLLING MEAL ASSISTANCE ROBOT THEREOF

CROSS-REFERENCE TO RELATED APPLICATIONS

This application claims priority under 35 U.S.C. § 119 to Korean Patent Application No. 10-2019-0125171 filed on Oct. 10, 2019 in the Korean Intellectual Property Office, the disclosure of which is incorporated herein by reference in its entirety.

TECHNICAL FIELD

The present disclosure relates to interaction between human and machine using biosignals, and more particularly, to a method for controlling a robot that helps humans to perform tasks or performs the tasks for humans based on brain-computer interface (BCI), a recording medium having the method recorded thereon, and an apparatus for controlling a meal assistance robot according to the method.

BACKGROUND

A brain-computer interface (BCI) is a means that allows for bidirectional communication by brain-to-computer connection, and refers to technology that enables direct connections between brain and computer using electroencephalogram (EEG) without using existing input/output devices such as audio and video devices. Accordingly, using BCI, decision making resulting from the brain's information processing is transmitted to a system sensor using a specific EEG when the user thinks and determines without using languages or physical behaviors to enable the computer to execute the corresponding command. A method of manipulating the computer using EEG, not a keyboard or a mouse, is useful for people with disabled or impaired physical activities, and thus studies of BCI have continuously been conducted. The related literature introduced below describes interface technology for communication with computers based on EEG.

Recently, many countries including Republic of Korea are estimated to become a super-aged society in which the proportion of people 65 years or older is 20% or higher. Under this presupposition, the Korean government announced to provide basic local governments with about 1,000 care robots for the disabled and elderly by the end of 2019 and develop 'care robots' for meal assistance, bedsore prevention and evacuation support in hospitals or care centers by the year 2021 at the cost of KRW 15.3 billion in order to expand the robot market. With the increasing interest and demand for so-called 'care robots', there is a growing trend in markets and patent applications of related technology every year. When BCI is combined with care robots, it is expected that many care services that have been performed through labor will be provided autonomously by users' own intention.

However, most of the conventional care robots including meal assistance robots are controlled through joysticks used as input means or voice recognition, and these conventional methods have control limitations because they are difficult for users with impaired physical activities to manipulate and impossible to provide feedback to incorrect selection.

Accordingly, there is a need to develop BCI based robot control technology to overcome the control limitations of care robots that help human activities such as meal assistance robots and provide self-feeding for the elderly and disabled having difficulty in doing physical activities.

RELATED LITERATURES

Non-Patent Literature

EEG-based Brain Computer Interface Technology, TaeWan Eum, Eung-Soo Kim, Communications of the Korean Institute of Information Scientists and Engineers, Vol. 22 No. 2, pp.5-19, 2004

SUMMARY

The present disclosure is designed to, in the conventional control of robots that help humans to do activities, solve the problem with much support labors still needed or user inconvenience in inputting commands for the robots, and to overcome the limitation and disadvantage that when brain-computer interface (BCI) is introduced into robot control, an electrode based device needs to insert a recording electrode into the cerebral cortex, and an electroencephalogram (EEG) based device has much noise in the measured EEG signal or has difficulty in interpreting the acquired EEG.

To solve the above-described technical problem, a method for controlling a robot based on BCI according to an embodiment of the present disclosure includes (a) acquiring, by a robot control apparatus, a first biosignal indicating an intention to start an operation of the robot from a user to operate the robot, (b) providing, by the robot control apparatus, the user with visual stimulation of differently set signal cycles corresponding to a plurality of objects for which the robot executes motions, and acquiring a second biosignal evoked by the visual stimulation from the user to identify an object selected by the user, and (c) acquiring, by the robot control apparatus, a third biosignal corresponding to a motion for the identified object from the user to induce the robot to execute the corresponding motion.

In the method for controlling a robot according to an embodiment, the first biosignal, the second biosignal and the third biosignal may be different types of EEG signals acquired through one EEG measuring means.

In the method for controlling a robot according to an embodiment, the step (a) may include (a1) receiving inputs of biosignals from the user having recognized the robot, and acquiring a first biosignal indicating an intention to start an operation of the robot among the input biosignals, and (a2) operating the robot in response to the first biosignal and waiting for the user's object selection.

In the method for controlling a robot according to an embodiment, the first biosignal may be at least one of an intended blink signal acquired through an EEG measuring means, a voice signal acquired through a microphone, and a motion or gesture signal acquired through a camera.

In the method for controlling a robot according to an embodiment, the step (b) may include (b1) differently setting a signal cycle for each of a plurality of objects for which the robot executes motions, (b2) applying a control signal to each signal generating means corresponding to the plurality of objects according to the set signal cycles to provide the user with visual stimulation of different cycles, (b3) receiving inputs of biosignals from the user having recognized visual stimulation corresponding to any one of the plurality of objects, and acquiring a second biosignal evoked by the visual stimulation among the input biosignals, and (b4)

identifying an object selected by the user using a synchronized signal cycle included in the second biosignal.

In the method for controlling a robot according to an embodiment, the second biosignal may be a steady state visually evoked potential (SSVEP) signal acquired through an EEG measuring means, and may include a signal cycle set for any one object selected by the user among the plurality of objects and a signal cycle synchronized through visual recognition.

In the method for controlling a robot according to an embodiment, the step (c) may include (c1) acquiring a third biosignal corresponding to a virtual motion for the identified object among the input biosignals from the user, and (c2) controlling the robot to execute a real motion for the identified object in response to the third signal.

In the method for controlling a robot according to an embodiment, the third biosignal may be a motor imagery signal acquired through an EEG measuring means.

In the method for controlling a robot according to an embodiment, the step (a) may fail to move to the step (b) and the step (c) and be on standby until the first biosignal is acquired among the plurality of types of biosignals inputted from the user, the step (b) may fail to move to the step (c) and be on standby until the second biosignal is acquired among the plurality of types of biosignals inputted from the user, and after the step (c) is completed, the step (a) or (b) may be performed to repeat the object selection and motion execution.

There is provided a computer-readable recording medium having recorded thereon a program for executing the method for controlling a robot on a computer.

To solve the above-described technical problem, an apparatus for controlling a meal assistance robot based on BCI according to another embodiment of the present disclosure includes an input unit to receive inputs of a plurality of types of biosignals measured from a user, a processing unit to generate a control signal for controlling the meal assistance robot according to the types of biosignals, and a signal generating means including a plurality of signal devices that operates according to the control signal applied from the processing unit corresponding to each of a plurality of menus for which the meal assistance robot executes motions, wherein the processing unit acquires a first biosignal indicating an intention to start an operation of the meal assistance robot from the user through the input unit to operate the meal assistance robot, provides the user with visual stimulation of differently set signal cycles corresponding to the plurality of menus through the signal generating means, acquires a second biosignal evoked by the visual stimulation from the user through the input unit to identify a menu selected by the user, and acquires a third biosignal corresponding to a motion for the identified menu from the user through the input unit to induce the meal assistance robot to execute a motion of supplying food of the corresponding menu.

In the apparatus for controlling a meal assistance robot according to another embodiment, the first biosignal, the second biosignal and the third biosignal may be different types of EEG signals acquired through one EEG measuring means.

In the apparatus for controlling a meal assistance robot according to another embodiment, the processing unit may receive inputs of biosignals from the user having recognized the meal assistance robot, acquire a first biosignal indicating an intention to start an operation of the meal assistance robot among the input biosignals, operate the meal assistance robot in response to the first biosignal and wait for the user's menu selection.

In the apparatus for controlling a meal assistance robot according to another embodiment, the first biosignal may be at least one of an intended blink signal acquired through an EEG measuring means, a voice signal acquired through a microphone, and a motion or gesture signal acquired through a camera.

In the apparatus for controlling a meal assistance robot according to another embodiment, the processing unit may differently set a signal cycle for each of the plurality of menus, apply a control signal to each signal device of the signal generating means corresponding to the plurality of menus according to the set signal cycles to provide the user with visual stimulation of different cycles, receive inputs of biosignals from the user having recognized visual stimulation corresponding to any one of the plurality of menus, acquire a second biosignal evoked by the visual stimulation among the input biosignals, and identify a menu selected by the user using a synchronized signal cycle included in the second biosignal.

In the apparatus for controlling a meal assistance robot according to another embodiment, the second biosignal may be a SSVEP signal acquired through an EEG measuring means, and may include a signal cycle set for any one object selected by the user from the plurality of objects and a signal cycle synchronized through visual recognition.

In the apparatus for controlling a meal assistance robot according to another embodiment, the signal generating means may include a plurality of signal devices that is provided in a container containing a plurality of menus and allocated to indicate the corresponding menu, and may generate visual stimulation according to different signal cycles through the allocated signal devices to induce visual recognition of the user.

In the apparatus for controlling a meal assistance robot according to another embodiment, the signal generating means may include a plurality of signal devices that is provided in an augmented reality (AR) device or a mixed reality (MR) device and allocated corresponding to a plurality of menus, and may generate visual stimulation according to different signal cycles through the allocated signal devices and provide the user with a real menu and augmented reality or mixed reality together to induce visual recognition.

In the apparatus for controlling a meal assistance robot according to another embodiment, the processing unit may acquire a third biosignal corresponding to a virtual food supply motion for the identified menu among the biosignals inputted from the user, and control the meal assistance robot to execute a real food supply motion for the identified menu in response to the third signal.

In the apparatus for controlling a meal assistance robot according to another embodiment, the third biosignal may be a motor imagery signal indicating a physical motion acquired through an EEG measuring means.

The embodiments of the present disclosure may separately identify EEG indicating the operation of the BCI system, EEG evoked by visual stimulation and EEG responsive to motor imagery among various EEGs of the user and use them for robot control, to allow the user to accurately determine a desired target object and control the robot to execute motions for the target object at a desired time, thereby inducing the user with impaired physical activities to do active and independent activities according to his/her intention and improving self-esteem as well as simultaneously reducing the labor, time and cost for helping the user.

DETAILED DESCRIPTION OF EMBODIMENTS

Prior to describing the embodiments of the present disclosure, after a brief introduction of the practical problem of the conventional technical means in an environment in which the embodiments of the present disclosure are implemented, the technical principle adopted by the embodiments of the present disclosure designed to solve the problem will be presented.

Figure 1:
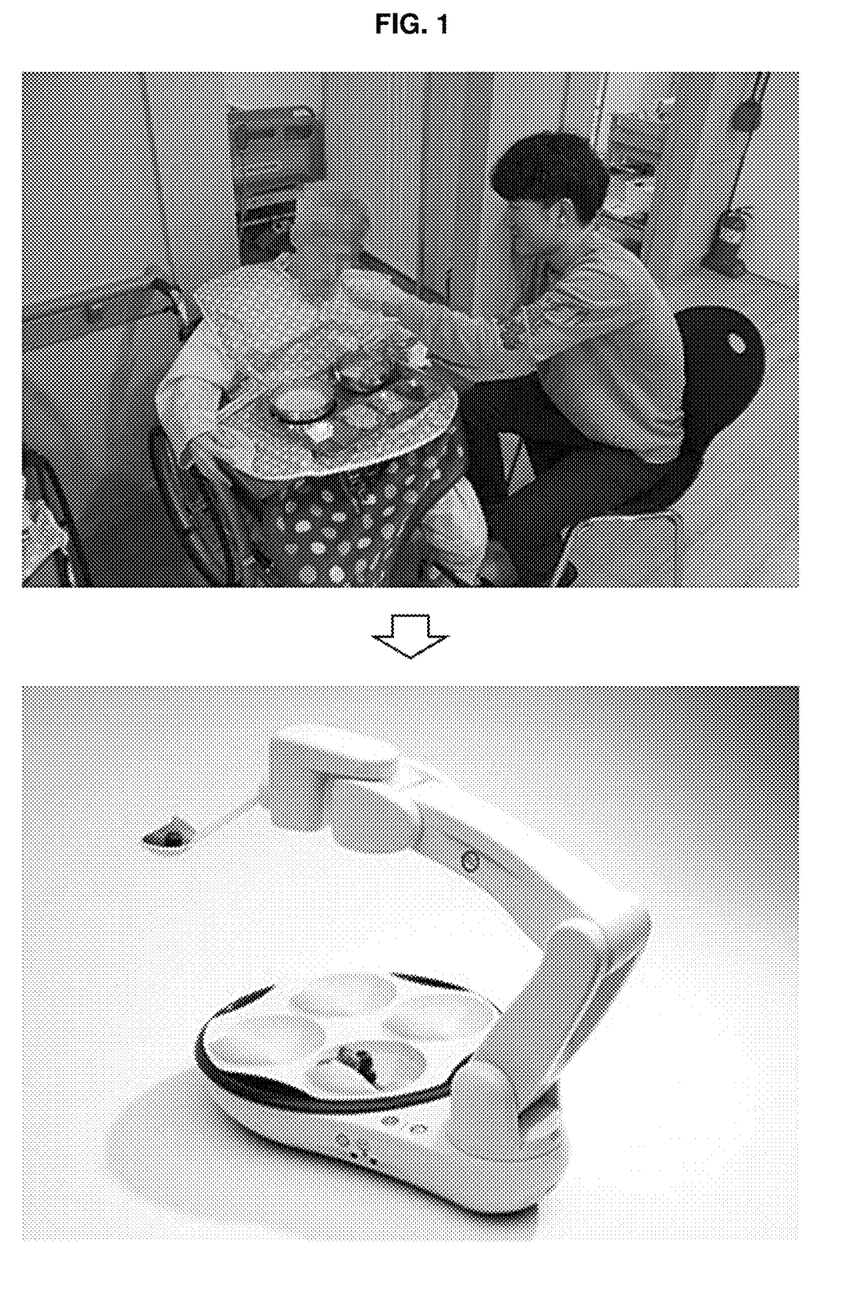
FIG. 1 is a diagram for introducing a problem appearing in the technical field in which the present disclosure may be used.

FIG. 1 is a diagram for introducing a problem appearing in the technical field in which the present disclosure may be used.

Referring to FIG. 1, it shows that a change may be made from an environment in which a care assistant directly helps a patient or elderly having limited physical activities to eat to an environment using a meal assistance robot. As the society is ageing rapidly, it is projected that shortage problems of labor, time and cost in care services will reach the serious level, and thus development of care robots is accelerating. Currently, meal assistance robots are developed for patients with Lou Gehrig's disease, the elderly having low muscle strength and the disabilities with upper body impairments, and they are intended to induce users to eat independently with an aim of improving self-esteem and quality of life.

However, as input methods of currently available meal assistance robots, automatic feeding methods are adopted in which a joystick is manipulated using the user's mouth or facial muscles, food is selected and transported to the mouth by repeatedly pressing a button, voice commands instructing the robots to operate are used, or food is mechanically supplied in a preset order and speed. These conventional methods require much time and efforts for users with impaired physical activities to get accustomed to the input methods, and still cause much inconvenience and discomfort in freely eating.

Accordingly, the embodiments of the present disclosure described hereinafter propose a technical means for acquiring biosignals of users, understanding the users' intention more conveniently and actively and transmitting their commands to robots. To this end, the embodiments of the present disclosure adopt brain-computer interface (BCI).

An access method for BCI largely includes a simultaneous multi-channel single-unit extracellular recording technique and a non-invasive method using electroencephalogram (EEG). The former, the electrode based BCI, can accurately measure the activities of neurons by a highly invasive method of inserting a recording electrode into the cerebral cortex, but its disadvantage is the insertion of the recording electrode into the cerebral cortex. In contrast, the latter, the EEG based BCI, is not easy to interpret due to much noise in measured EEG signals. Considering universality and convenience of signal acquisition, the embodiments of the present disclosure adopt the latter, the EEG based method.

Hereinafter, the embodiments of the present disclosure will be described in detail with reference to the accompanying drawings. However, in the following description and the accompanying drawings, a detailed description of known function or element that may render the key subject matter of the present disclosure ambiguous is omitted herein. In addition, the term 'comprises' when used in this specification, does not exclude other elements and may further include other elements, unless the context clearly indicates otherwise.

Additionally, the terms "first", "second", and the like may be used to describe various elements, but the elements should not be limited by the terms. These terms may be used to distinguish one element from another. For example, a first element may be called a second element without departing from the scope of protection of the present disclosure, and likewise, a second element may be called a first element.

The terminology used herein is for the purpose of describing particular embodiments only and is not intended to be limiting of the present disclosure. As used herein, the singular forms are intended to include the plural forms as well, unless the context clearly indicates otherwise. It will be understood that the term "comprises" or "includes" when used in this specification, specifies the presence of stated features, integers, steps, operations, elements, components or groups thereof, but does not preclude the presence or addition of one or more other features, integers, steps, operations, elements, components, or groups thereof.

Unless otherwise defined, all terms including technical and scientific terms as used herein have the same meaning as commonly understood by those having ordinary skill in the technical field pertaining to the present disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

Figure 2:
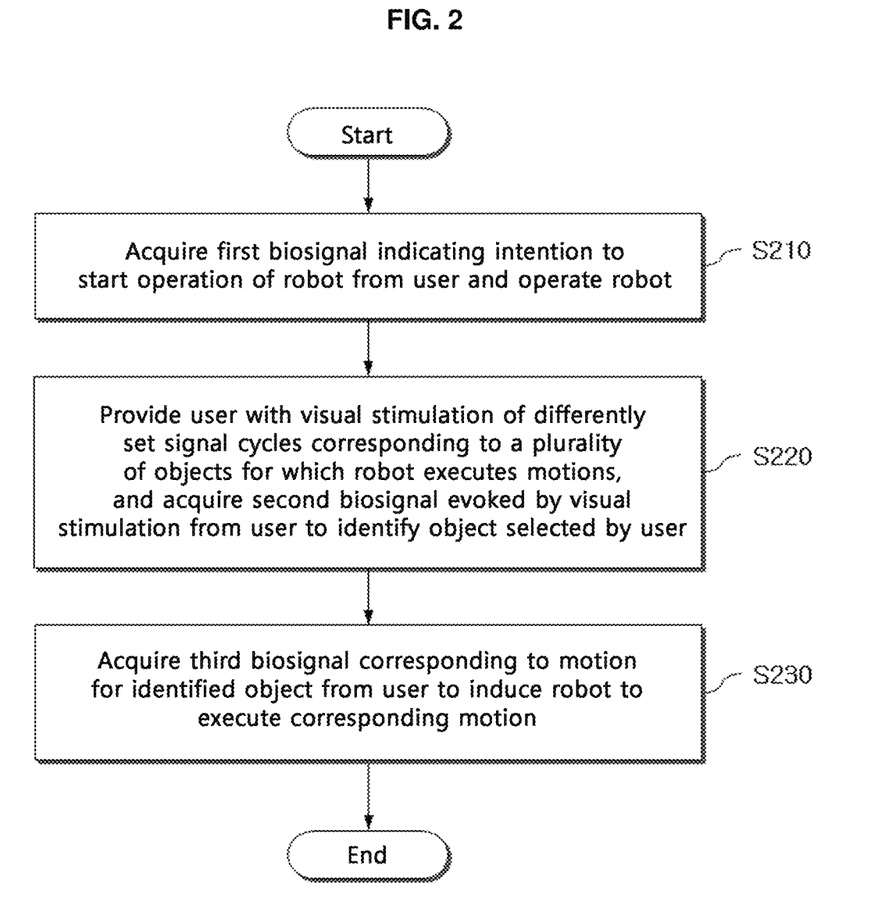
FIG. 2 is a flowchart showing a method for controlling a robot based on brain-computer interface (BCI) according to an embodiment of the present disclosure.

FIG. 2 is a flowchart showing a method for controlling a robot based on BCI according to an embodiment of the present disclosure, and presents a series of processes of generating a control signal for controlling the robot by interpreting biosignals inputted from a user on the premise that there is a means for acquiring biosignals from the user.

In step S210, a robot control apparatus acquires a first biosignal indicating an intention to start the operation of the robot from the user to operate the robot.

Because biosignals acquired from humans come in various types and it is very difficult to identify each biosignal or understand the meaning, the following robot control process performs its procedure according to a time sequential determination process. This process does not move to the next step and is on standby until the first biosignal indicating an intention to start the operation of the robot is acquired among the plurality of types of biosignals inputted from the user. When the first biosignal defined as indicating an intention to start the operation of the robot is detected among the various biosignals, an input of a biosignal to check next is detected by the operation of the robot. In this instance, an EEG blink signal in various EEG patterns may be used as a trigger signal for the user to do a specific motion (for example, a feeding activity), and the EEG blink signal will be described in more detail through FIG. 5 below.

In the step S220, the robot control apparatus provides the user with visual stimulation of differently set signal cycles corresponding to a plurality of objects for which the robot executes motions, and acquires a second biosignal evoked by the visual stimulation from the user to identify an object selected by the user. In a situation of the plurality of objects for which the robot executes motions, when the user selects any one from the objects, this process provides a technique that accurately recognizes the object selected by the user.

To this end, the embodiments of the present disclosure make use of biosignals evoked by visual stimulation among various biosignals that can be acquired from humans. Particularly, visual stimulation provided to the user is applied differently for each object to distinguish the plurality of objects. First, any one of visual stimulation of differently set signal cycles corresponding to the plurality of objects is illuminated to the user. The visual stimulation is recognized by the user through an eye, and the feature of the signal cycle of the corresponding visual stimulation is included in the biosignal acquired from the user. Accordingly, the robot control apparatus acquires the biosignal evoked by the visual stimulation and extracts the feature of the signal cycle included in the acquired biosignal to identify the object visually recognized by the user. The signal cycle may be, for example, the frequency of the light signal.

The reason why the embodiments of the present disclosure select light signals of different signal cycles as a source that generates visual stimulation is because in a situation in which the plurality of objects exist close to each other within one space, a means for distinguishing each object most accurately is 'signal cycle' appearing in visual stimulation. For example, it is found that it is not easy to identify each object from the biosignals evoked from a difference in color or brightness of the objects. Accordingly, preferably, the embodiments of the present disclosure illuminate light signals having different frequencies for each of the plurality of objects to the user in parallel. At this time, even though there are multiple light signals illuminated at the same time, a physiological phenomenon occurs in which EEG is synchronized with the frequency of a light signal illuminated from (or corresponding to) one object that the user himself/herself concentrates on and recognizes. Accordingly, the robot control apparatus identifies the object selected by the user by finding an object set to have the same frequency as the acquired biosignal (EEG).

Additionally, the second biosignal may be a steady state visually evoked potential (SSVEP) signal. Once the EEG blink signal is acquired, different SSVEP visual stimulation respectively corresponding to the plurality of objects is activated. In this instance, preferably, the robot control apparatus keeps the SSVEP visual stimulation active until a SSVEP pattern for a desired food menu is inputted from the user.

Preferably, this process also does not move to the next step and is on standby until the second biosignal evoked by the visual stimulation is acquired among the plurality of types of biosignals inputted from the user. This is because the robot needs to identify the object selected by the user before the robot executes a specific motion.

In the step S230, the robot control apparatus acquires a third biosignal corresponding to a motion for the object identified through the step S220 from the user to induce the robot to execute the corresponding motion. As the target object intended by the user is identified, it is necessary to transmit a command to allow the motion to be executed through the robot.

To this end, the robot control apparatus detects whether the third biosignal indicating an executable motion for the identified object is inputted. In this instance, the "executable motion" may be a single motion, but if necessary, may be a plurality of motions, and further, may be defined as a series of time-sequential continuous motions. For example, when the target object is food, the executable motion may be a continuous motion of picking up the food as well as bringing it to the user's mouth. However, these motions should be preset, and when the biosignal inputted from the user is a signal other than a preset one, the robot control apparatus will ignore the biosignal.

The "executable motion" may be defined as a human physical motion. Because the third biosignal may be also acquired from human EEG, it is desirable to set a motion that the user can execute using his/her body to easily control the robot using thought or imagination as if the user with impaired physical activities can freely move the body. That is, the third biosignal may be an EEG generated from the user's brain when the user comes up with an idea about executing a specific motion for the target object by moving his/her body.

Additionally, the third biosignal may be a motor imagery (MI) signal. For example, when a SSVEP pattern of a desired food menu is acquired, the meal assistance robot selects the food menu and scoops it, and then is on standby until a motor imagery pattern for the user's dominant hand (a right hand or a left hand) is inputted. Subsequently, when the motor imagery pattern indicating the user's food feeding intention is acquired, the meal assistance robot brings the previously selected food to the user's mouth. Subsequently, the robot control apparatus is on standby again until another EEG blink signal is inputted.

After the step S230 is completed, the robot control apparatus moves to the step S210 or S220 to repeat object selection and motion execution for sequential processing of the motions for the plurality of objects. For example, to eat food one by one through the meal assistance robot, it is necessary to repeat the motion of selecting each one food and bringing it to the user's mouth, and similar motions are repeated each time, and in each iteration, different foods (menus or items) are selected.

Figure 3:
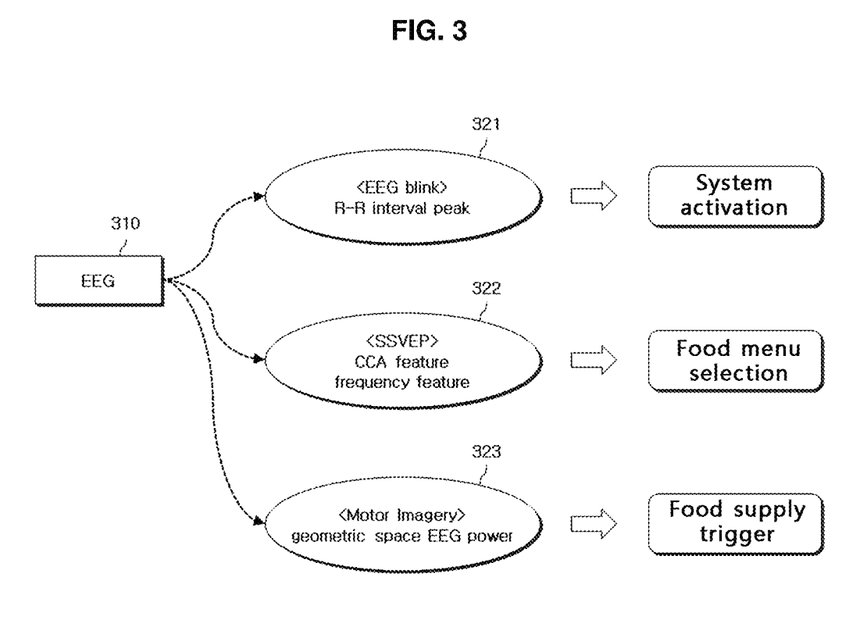
FIG. 3 is a diagram illustrating the type of electroencephalogram (EEG) signal used in embodiments of the present disclosure.

FIG. 3 is a diagram illustrating the type of EEG signal used in the embodiments of the present disclosure.

Although there are various available means for interaction between human and robot, the embodiments of the present disclosure intend to carry out interaction by use of only a minimum of communication means as possible. This single communication means is essentially for maximizing the user convenience. Accordingly, the first biosignal, the second biosignal and the third biosignal according to an embodiment of the present disclosure as described previously are preferably different types of EEG signals acquired through one EEG measuring means. That is, the robot is controlled through analysis of various EEG patterns according to an intended purpose of use such as meal assistance control based on unimodal EEG.

Referring to FIG. 3, first, an EEG 310 is inputted from the user through an EEG sensor. The EEG includes a set of various types of EEG signals, and the embodiments of the present disclosure pay attention to the following three types of EEGs.

The first type of EEG is an "EEG blink" signal 321. The EEG blink is an EEG evoked by an "intended eye blink", and in the field of general EEG processing technology, it is regarded as noise and removed in some instances, but in the embodiments of the present disclosure, it acts as an on/off switch to activate the operation of the robot. That is, the EEG blink signal of the frontal lobe in the EEG pattern is acquired and used as an activation trigger signal of the robot, thereby controlling the activation of the robot at a desired time. Particularly, as opposed to an electrooculogram (EOG) signal based on electromyogram, the EEG blink signal can be acquired through a single EEG measuring sensor without an additional sensor, thereby maintaining unimodality.

The second type of EEG is a "SSVEP" signal 322. The SSVEP is an electrical signal that can be measured at the part of the parietal lobe and the occipital lobe in which the visual cortex is positioned in response to visual stimulation, and the embodiments of the present disclosure can identify each object using the signal cycles set differently for each object. For example, a specific food that the user desires may be selected using a visual stimulation pattern that varies depending on the location of each food menu or each food item in a situation in which there are various food menus. At meals, the user can select a desired food from various menus/items with high accuracy through the SSVEP pattern.

The third type of EEG is a "motor imagery (MI)" signal 323. For example, a motor imagery pattern for the user's dominant hand is acquired and used as a feeding trigger, thereby allowing the user to control the robot to execute a food feeding activity at a desired time. Through this, it is possible to overcome the problem of the conventional meal assistance method that is difficult for the user to take the lead in determining the feeding time.

Figure 4:
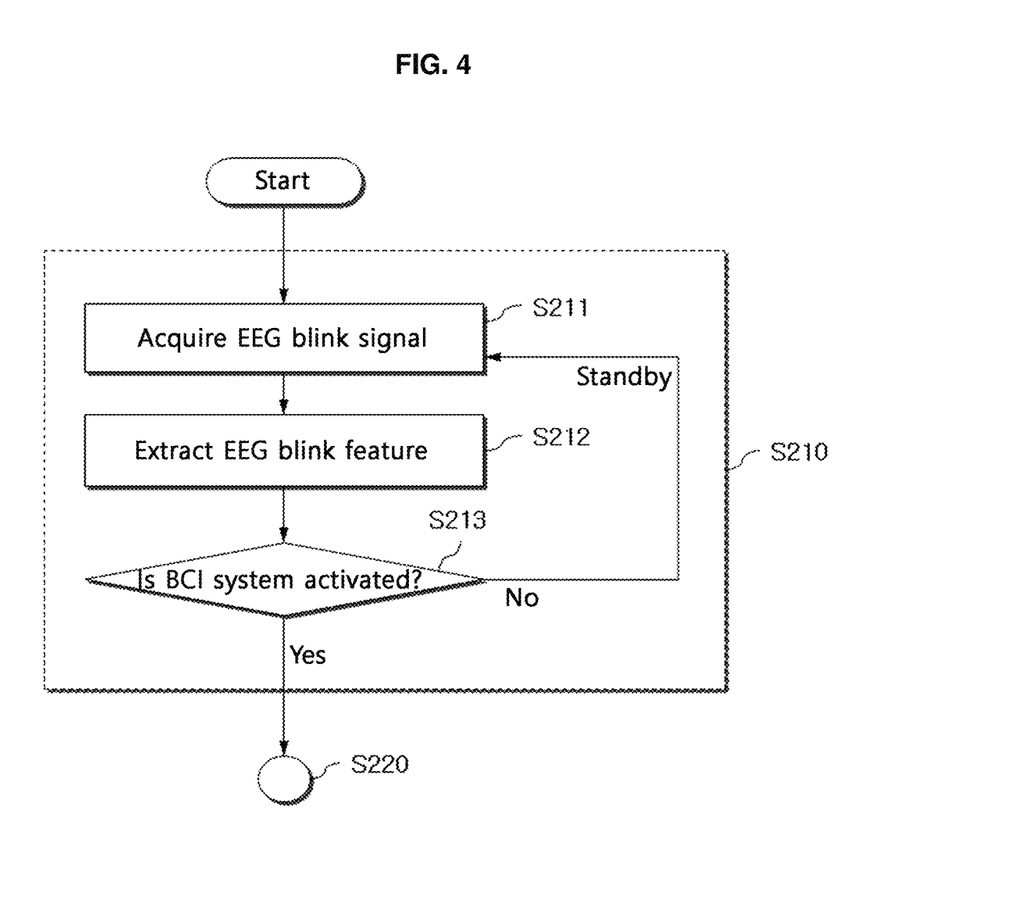
FIG. 4 is a detailed flowchart showing a process of activating a BCI system in the robot control method of FIG. 2 according to an embodiment of the present disclosure.

FIG. 4 is a detailed flowchart showing the process S210 of activating the BCI system in the robot control method of FIG. 2 according to an embodiment of the present disclosure.

The robot control apparatus receives inputs of biosignals (for example, EEG blink signals) from the user having recognized the robot through the step S211, and acquires a first biosignal indicating an intention to start the operation of the robot among the previously inputted biosignals through the step S212. Subsequently, in the step S213, the robot control apparatus determines whether the robot using BCI is activated, and when activated, operates the robot in response to the first biosignal, moves to the step S220 and waits for the user's object selection. Otherwise, the robot control apparatus returns to the step S211 and waits for EEG blink signal acquisition.

Figure 5:
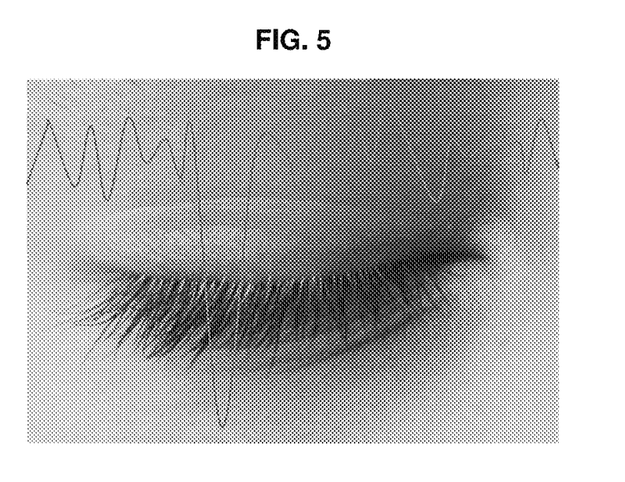
FIG. 5 is a showing an exemplary EEG that may be used for activation of a BCI system.

FIG. 5 is a diagram showing an exemplary EEG that may be used for activation of the BCI system. The first biosignal indicating an intention to start the operation of the robot preferably uses an intended blink signal acquired through an EEG measuring means, but according to the necessity of implementation, may be at least one of a voice signal acquired through a microphone and a motion or gesture signal acquired through a camera. However, as described previously, for the user convenience, it is desirable to use an EEG blink signal in unimodal condition.

Figure 6:
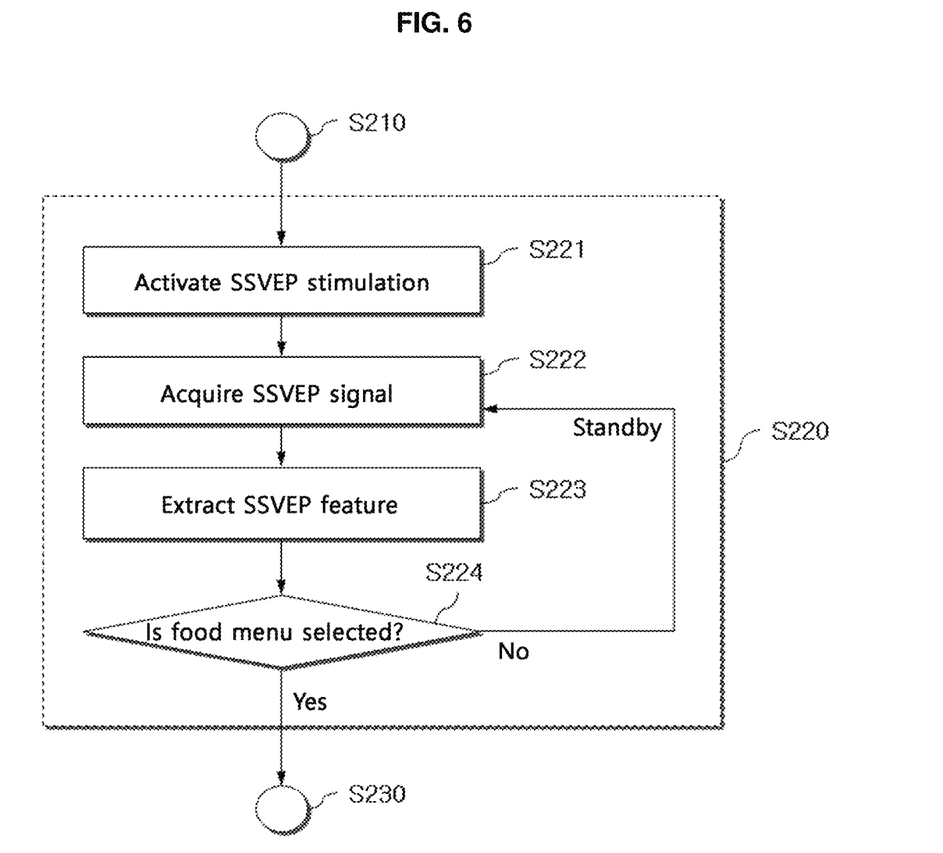
FIG. 6 is a detailed flowchart showing a process of selecting a food menu in the robot control method of FIG. 2 according to an embodiment of the present disclosure.

FIG. 6 is a detailed flowchart showing the process S220 of selecting a food menu in the robot control method of FIG. 2 according to an embodiment of the present disclosure.

The robot control apparatus differently sets the signal cycle for each of the plurality of objects for which the robot executes motions through the step S221, and applies a control signal to each signal generating means corresponding to the plurality of objects according to the set signal cycles to provide the user with visual stimulation (for example, SSVEP stimulation) of different cycles. Subsequently, the robot control apparatus receives inputs of biosignals from the user having recognized visual stimulation corresponding to any one of the plurality of objects through the step S222, and acquires a second biosignal (for example, a SSVEP signal) evoked by the visual stimulation among the previously inputted biosignals through the step S223. Then, in the step S224, the robot control apparatus identifies the object selected by the user using the synchronized signal cycle included in the second biosignal. When the selected object is accurately identified, the robot control apparatus moves to the step S230, and otherwise, returns to the step S222 and waits for second biosignal acquisition.

Figure 7:
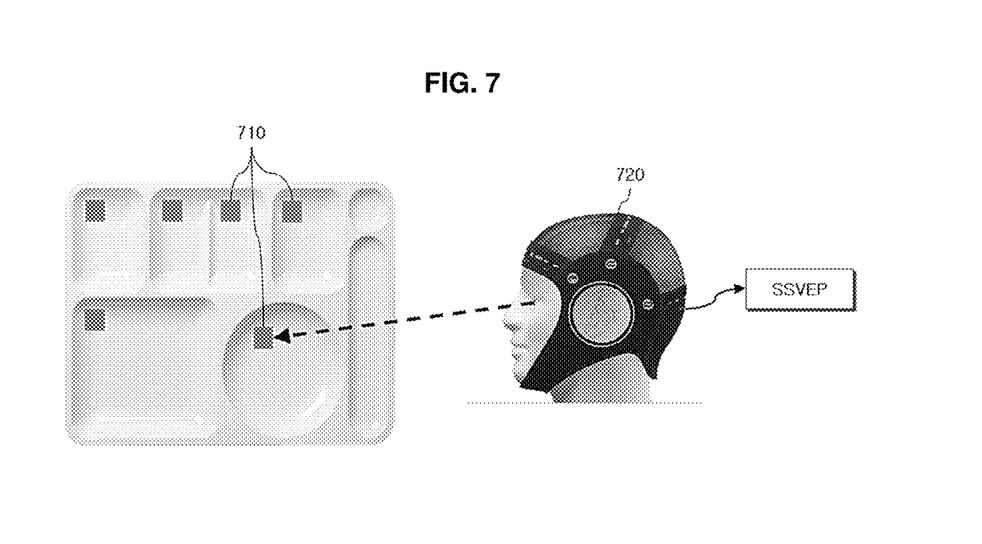
FIG. 7 is a diagram illustrating a process of recognizing a selection of a food menu through provision of visual stimulation.

FIG. 7 is a diagram illustrating a process of recognizing a selection of a food menu through provision of visual stimulation, and it is assumed that the second biosignal is measured from the user through an EEG measuring means 720, and food menus are placed in each of divided spaces of a plate. A signal generating means 710 may generate visual stimulation of signal cycles set differently for each menu or item. The signal generating means may include a plurality of signal devices, for example, light-emitting diode (LED) lighting, as much as the number of the divided spaces.

Referring to FIG. 7, the second biosignal evoked by visual stimulation is a SSVEP signal acquired through the EEG measuring means 720, and includes a signal cycle set for any one object selected by the user from the plurality of objects (food menus) and a signal cycle synchronized through visual recognition. First, when the EEG blink signal is acquired, SSVEP visual stimulation is activated through the LED lighting of the plate. When the user sees a desired menu among the food menus on the plate, the visual stimulation frequency of the LED lighting of the plate and the user's EEG are synchronized, and a SSVEP pattern of the desired menu is acquired. SSVEP activation is maintained until the SSVEP pattern is acquired.

Figure 8:
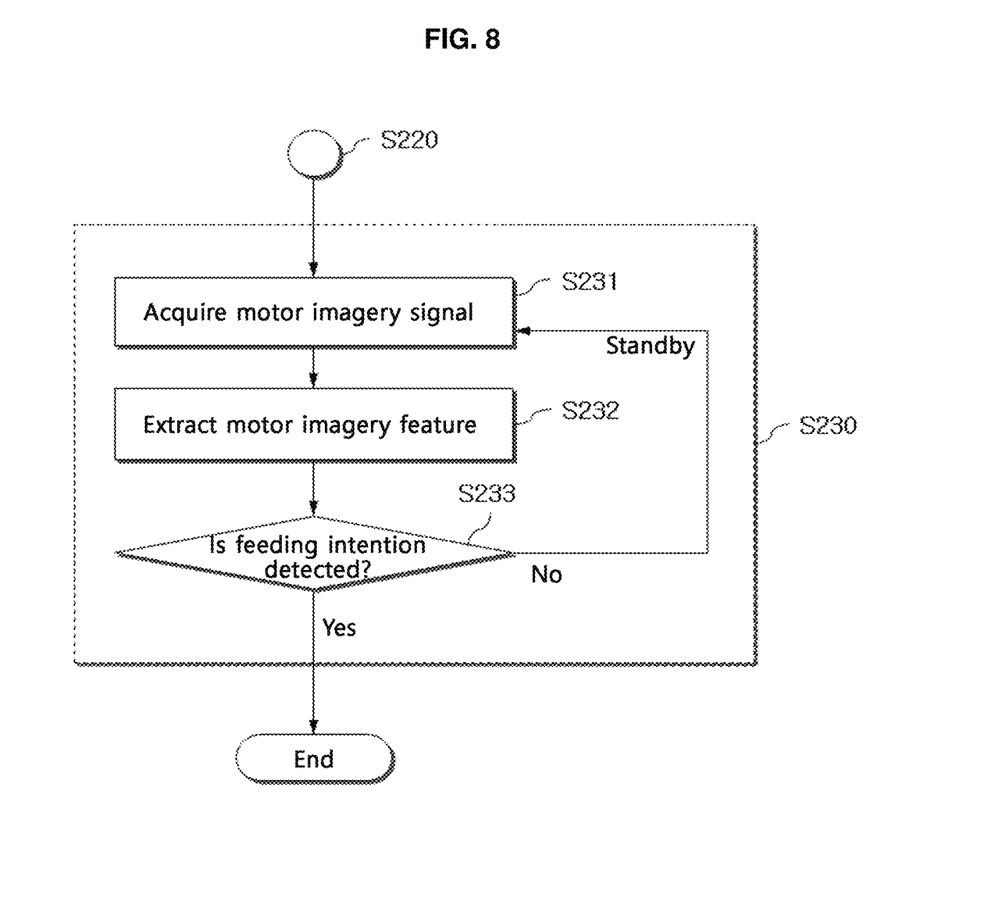
FIG. 8 is a detailed flowchart showing a process of understanding a user's feeding intention in the robot control method of FIG. 2 according to an embodiment of the present disclosure.

FIG. 8 is a detailed flowchart showing the process S230 of understanding the user's feeding intention in the robot control method of FIG. 2 according to an embodiment of the present disclosure.

The robot control apparatus receives inputs of biosignals from the user through the step S231, and acquires a third biosignal (for example, a motor imagery signal) corresponding to a virtual motion (for example, a motion intended to eat food) for the identified object among the previously inputted biosignals through the step S232. Subsequently, in the step S233, the robot control apparatus detects a real motion for the identified object in response to the third signal, generates a command to control the robot to execute the detected real motion and transmits the command to the robot. When motion detection fails, the robot control apparatus returns to the step S231 and waits for third biosignal acquisition.

Figure 9:
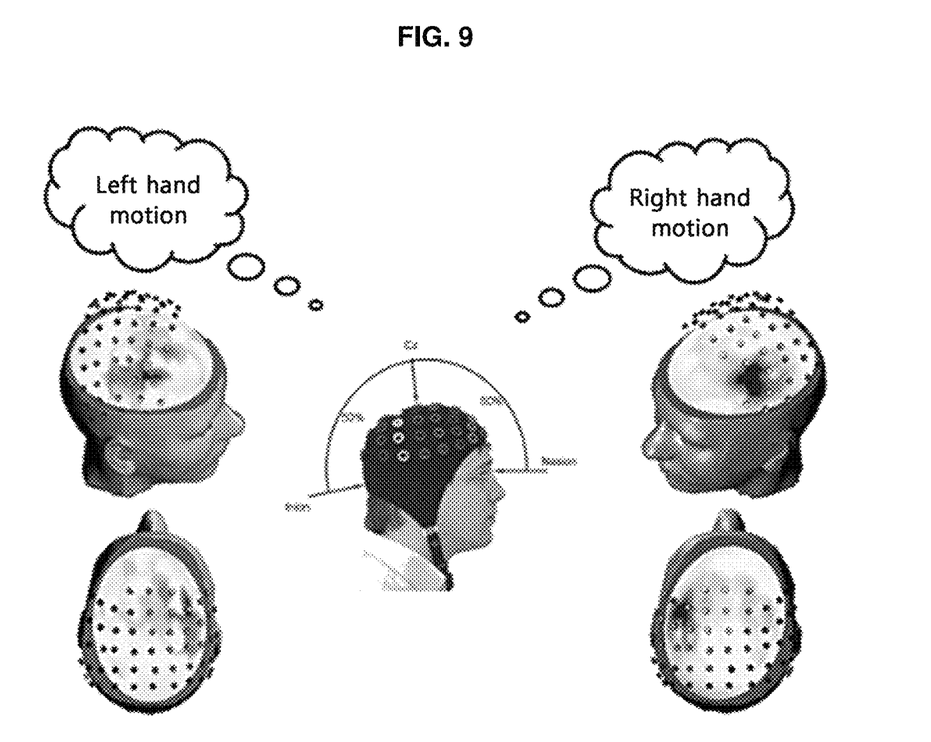
FIG. 9 is a diagram showing an exemplary EEG that may be used to understand a user's feeding intention.

FIG. 9 is a diagram showing an exemplary EEG that may be used to understand the user's feeding intention, and as described previously, the third biosignal may be a motor imagery signal acquired through the EEG measuring means. For example, when the user considers a feeding activity, a motor imagery pattern of the dominant hand (for example, a right or left hand motion) is acquired from the user's EEG. As the feeding activity is on standby until the motor imagery pattern is acquired, the user himself/herself can take the lead in feeding through this control structure.

Figure 10:
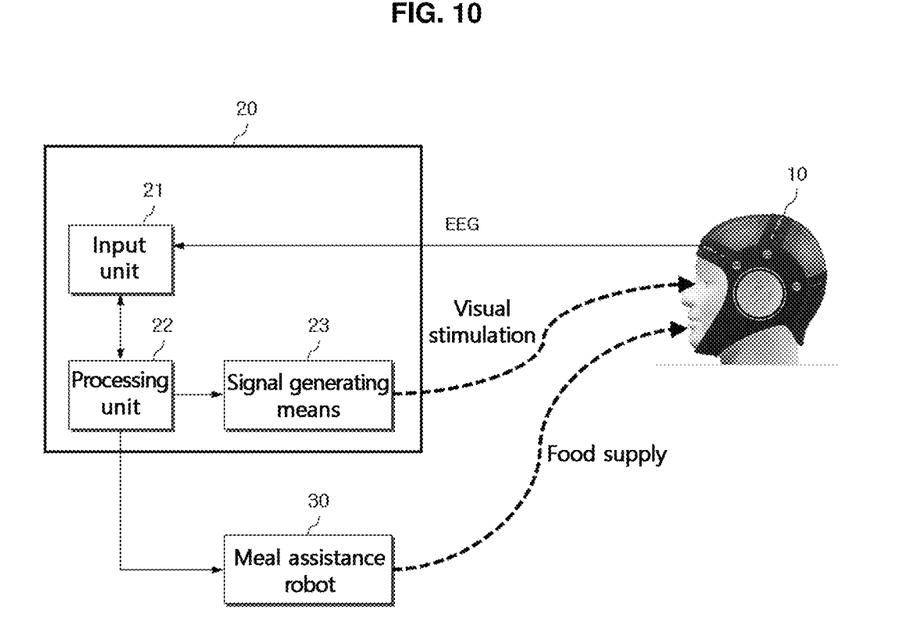
FIG. 10 is a block diagram showing an apparatus for controlling a meal assistance robot based on BCI according to another embodiment of the present disclosure.

FIG. 10 is a block diagram showing an apparatus 20 for controlling the meal assistance robot 30 based on BCI according to another embodiment of the present disclosure, and is re-configuration of the robot control method described through FIG. 2 from the perspective of hardware configuration of the meal assistance robot. Accordingly, to avoid redundant descriptions, the operation and function of each element of the apparatus will be described in brief on the premise of a situation of assisting the user in having meals.

The apparatus 20 for controlling a meal assistance robot includes an input unit 21 to receive inputs of a plurality of types of biosignals measured from a user, a processing unit 22 to generate a control signal for controlling the meal assistance robot 30 according to the types of biosignals, and a signal generating means 23 including a plurality of signal devices that operates according to the control signals applied from the processing unit corresponding to each of a plurality of menus for which the meal assistance robot 30 executes motions. The processing unit 22 acquires a first biosignal indicating an intention to start the operation of the meal assistance robot 30 from the user through the input unit 21 to operate the meal assistance robot 30, provides the user with visual stimulation of differently set signal cycles corresponding to the plurality of menus through the signal generating means 23, acquires a second biosignal evoked by the visual stimulation from the user through the input unit 21 to identify a menu selected by the user, and acquires a third biosignal corresponding to a motion for the identified menu from the user through the input unit 21 to induce the meal assistance robot 30 to execute a motion of supplying food of the corresponding menu. In this instance, the first biosignal, the second biosignal and the third biosignal are preferably different types of EEG signals acquired through one EEG measuring means 10.

The processing unit 22 may receive inputs of biosignals from the user having recognized the meal assistance robot 30, acquire a first biosignal indicating an intention to start the operation of the meal assistance robot among the input biosignals, operate the meal assistance robot in response to the first biosignal and wait for the user's menu selection. In this instance, the first biosignal may be at least one of an intended blink signal acquired through the EEG measuring means 10, a voice signal acquired through a microphone and a motion or gesture signal acquired through a camera.

The processing unit 22 may differently set the signal cycle for each of the plurality of menus, apply a control signal to each signal device of the signal generating means 23 corresponding to the plurality of menus according to the set signal cycles to provide the user with visual stimulation of different cycles, receive inputs of biosignals from the user having recognized visual stimulation corresponding to any one of the plurality of menus, acquire a second biosignal evoked by the visual stimulation among the input biosignals, and identify the menu selected by the user using the synchronized signal cycle included in the second biosignal. In this instance, the second biosignal is a SSVEP signal acquired through the EEG measuring means 10, and may include the signal cycle set for any one object selected by the user among the plurality of objects and the signal cycle synchronized through visual recognition.

The processing unit 22 may acquire a third biosignal corresponding to a virtual food supply motion for the identified menu among the biosignals inputted from the user, and control the meal assistance robot 30 to execute a real food supply motion for the identified menu in response to the third signal. In this instance, the third biosignal may be a motor imagery signal indicating a physical motion acquired through the EEG measuring means 10.

Figure 11:
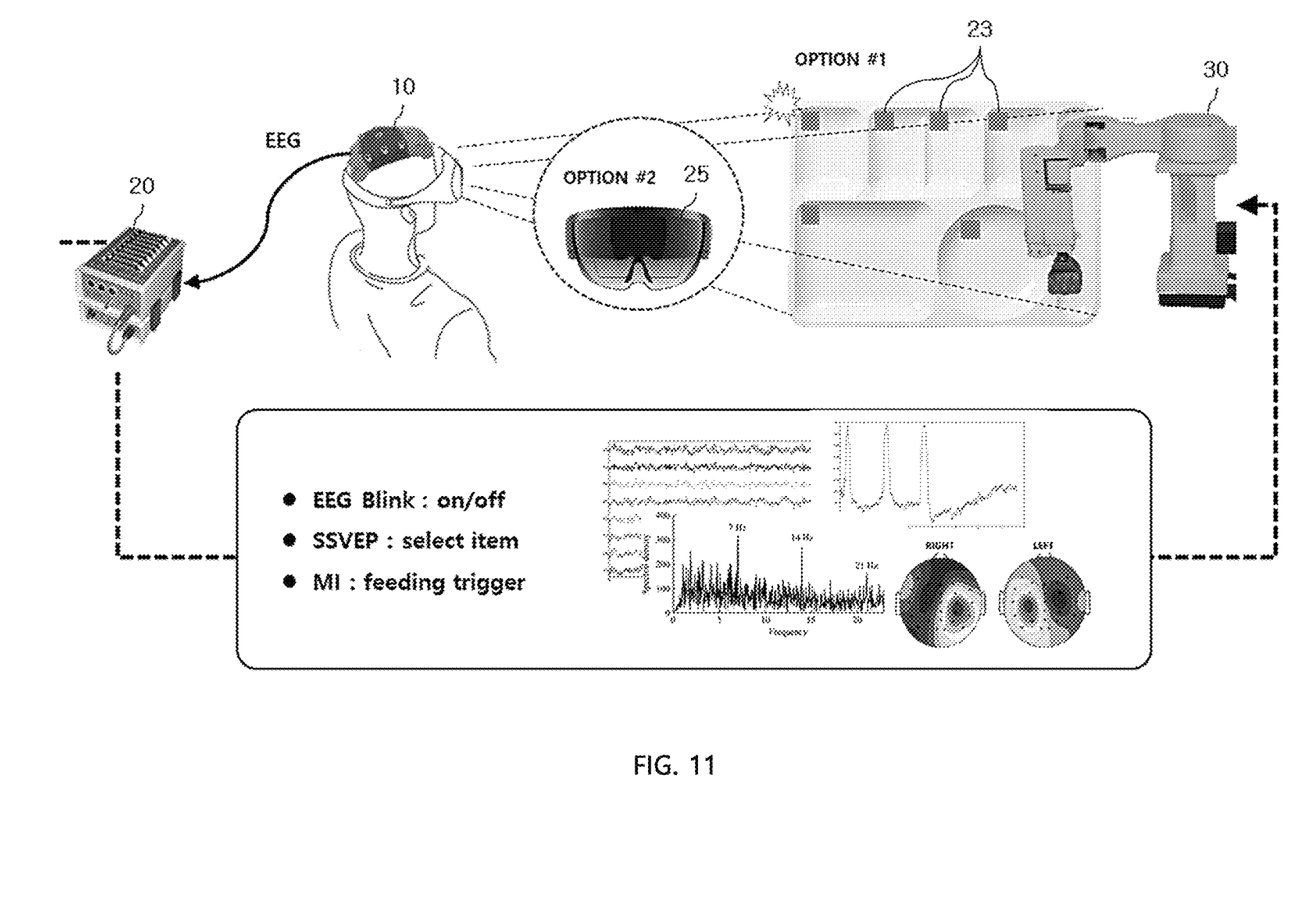
FIG. 11 is a diagram showing exemplary various means for providing visual stimulation in the apparatus for controlling a meal assistance robot of FIG. 10 according to another embodiment of the present disclosure.

FIG. 11 is a diagram showing exemplary various means for providing visual stimulation in the apparatus 20 for controlling the meal assistance robot 30 of FIG. 10 according to another embodiment of the present disclosure, and the same reference numerals denote the same elements as those of FIG. 10 and its description is omitted herein. Referring to FIG. 11, two methods of providing visual stimulation are presented.

First, as described previously through FIG. 7, LED lighting 23 provided in each divided area of the plate may be used as a visual stimulation providing means. That is, the signal generating means includes a plurality of signal devices that is provided in a container containing a plurality of menus and allocated to display the corresponding menus, and the signal generating means generates visual stimulation according to different signal cycles through the allocated signal devices to induce the visual recognition of the user.

Second, visual stimulation corresponding to each food viewed by the user may be applied using a head-mounted display (HMD) 25 for augmented reality. The respective visual stimulation may be set to have different cycles for each food and displayed such that they are overlapped on the foods. In this instance, when the user concentrates on and recognizes a specific food, the user's EEG is synchronized with the signal cycle of visual stimulation overlapped on the corresponding food, and then the menu selected by the user may be identified. That is, the signal generating means includes a plurality of signal devices that is provided in an augmented reality (AR) device or a mixed reality (MR) device and allocated corresponding to the plurality of menus, to generate visual stimulation according to different signal cycles through the allocated signal devices, thereby providing the user with the real menus and augmented reality or mixed reality together to induce the visual recognition.

According to the above-described embodiments of the present disclosure may identify EEG indicating the operation of the BCI system, EEG evoked by visual stimulation and EEG responsive to motor imagery among various EEGs of the user, and use them for robot control to allow the user to accurately determine a desired target object and control the robot to execute motions for the target object at a desired time, thereby inducing the user with impaired physical activities to do active and independent activities according to his/her intention and improving self-esteem, as well as simultaneously reducing the labor, time and cost for helping the user.

Particularly, in controlling the meal assistance robot disclosed herein, beyond elderly/disability feeding activities with the help of care assistants, the user can take the lead in controlling the meal assistance robot through various EEG patterns in augmented reality/virtual reality or real environment without voice commands for robot control or joystick manipulation. Above all, the embodiments of the present disclosure adopt a unimodal input method to improve user convenience, and subclassify the type of EEG and structure each control sequence, thereby achieving real-time BCI control with high reliability.

Further, the embodiments of the present disclosure can be used to control the meal assistance robot disclosed herein as well as appliances used in real life or mobility assistance robots, and have a range of applications including smart home, health care, silver industry, and game industry.

Meanwhile, the embodiments of the present disclosure may be implemented in computer-readable code on computer-readable recording media. The computer-readable recording media include all types of recording devices for storing data that can be read by a computer system.

Examples of the computer-readable recording media include ROM, RAM, CD-ROM, magnetic tape, floppy disk and optical data storage devices. Additionally, the computer-readable recording media may be distributed over computer systems connected via a network to store and execute the computer-readable code in a distributed manner. Additionally, functional programs, codes and code segments for implementing the present disclosure may be easily inferred by programmers in the technical field pertaining to the present disclosure.

The present disclosure has been hereinabove described based on various embodiments. Those having ordinary skill in the technical field pertaining to the present disclosure will understand that the present disclosure may be embodied in modified forms without departing from the essential features of the present disclosure. Therefore, the embodiments disclosed herein should be considered in a descriptive sense, not in a limiting sense. The scope of the present disclosure is defined in the appended claims, not in the above-described description, and it should be interpreted that the present disclosure covers all differences within its equivalent scope.

DETAILED DESCRIPTION OF MAIN ELEMENTS

10: Biosignal/EEG measuring means
20: Robot control apparatus
21: Input unit
22: Processing unit
23: Signal generating means
25: Augmented reality device
30: Meal assistance robot

What is claimed is:

1. A method for controlling a robot, comprising:
    (a) acquiring, by a robot control apparatus, a first biosignal indicating an intention to start an operation of the robot from a user to operate the robot;
    (b) providing, by the robot control apparatus, the user with visual stimulation of differently set signal cycles corresponding to a plurality of objects for which the robot executes motions, and acquiring a second biosignal evoked by the visual stimulation from the user to identify an object selected by the user; and
    (c) acquiring, by the robot control apparatus, a third biosignal corresponding to a virtual motion for the identified object from the user to induce the robot to execute the corresponding motion.

2. The method for controlling a robot according to claim 1, wherein the first biosignal, the second biosignal and the third biosignal are different types of electroencephalogram (EEG) signals acquired through one EEG measuring sensor.

3. The method for controlling a robot according to claim 1, wherein the step (a) comprises:
    (a1) receiving inputs of biosignals from the user having recognized the robot, and acquiring the first biosignal indicating the intention to start the operation of the robot from among the input biosignals; and
    (a2) operating the robot in response to the first biosignal and waiting for the user's object selection.

4. The method for controlling a robot according to claim 1, wherein the first biosignal is at least one of an intended blink signal acquired through an EEG measuring sensor, a voice signal acquired through a microphone, or a motion or gesture signal acquired through a camera.

5. The method for controlling a robot according to claim 1, wherein the step (b) comprises:
    (b1) differently setting a signal cycle for each of the plurality of objects for which the robot executes motions;
    (b2) applying a control signal to each of at least one visual signal generating circuit device corresponding to the plurality of objects according to the set signal cycles to provide the user with the visual stimulation of the differently set cycles;
    (b3) receiving inputs of biosignals from the user having recognized visual stimulation corresponding to any one of the plurality of objects, and acquiring the second biosignal evoked by the visual stimulation from among the input biosignals; and
    (b4) identifying the object selected by the user using a synchronized signal cycle included in the second biosignal.

6. The method for controlling a robot according to claim 1, wherein the second biosignal is a steady state visually evoked potential (SSVEP) signal acquired through an EEG measuring sensor, and includes a signal cycle set for any one object selected by the user from among the plurality of objects and a signal cycle synchronized through visual recognition.

7. The method for controlling a robot according to claim 1, wherein the step (c) comprises:
    (c1) acquiring the third biosignal corresponding to the virtual motion for the identified object from among input biosignals from the user; and
    (c2) controlling the robot to execute a real motion for the identified object in response to the third biosignal.

8. The method for controlling a robot according to claim 1, wherein the third biosignal is a motor imagery signal acquired through an EEG measuring sensor.

9. The method for controlling a robot according to claim 1, wherein the step (a) fails to move to the step (b) and the step (c) and is on standby until the first biosignal is acquired from among the first, second and third biosignals inputted from the user,
    the step (b) fails to move to the step (c) and is on standby until the second biosignal is acquired from among the first, second and third biosignals inputted from the user, and
    after the step (c) is completed, the step (a) or (b) is performed to repeat the object selection and motion execution.

10. A non-transitory computer-readable recording medium having recorded thereon a program for executing the method according to claim 1 on a computer.

11. An apparatus for controlling a meal assistance robot, comprising:
an input unit that receives inputs of a plurality of types of biosignals measured from a user;
a processing unit that generates a control signal for controlling the meal assistance robot according to the types of biosignals; and
a plurality of visual signal generating circuit devices that operates according to the control signal applied from the processing unit corresponding to each of a plurality of menus for which the meal assistance robot executes motions,
wherein the processing unit acquires a first biosignal indicating an intention to start an operation of the meal assistance robot from the user through the input unit to operate the meal assistance robot, provides the user with visual stimulation of differently set signal cycles corresponding to the plurality of menus through the visual signal generating circuit devices, acquires a second biosignal evoked by the visual stimulation from the user through the input unit to identify a menu selected by the user, and acquires a third biosignal corresponding to a virtual food supply motion for the identified menu from the user through the input unit to induce the meal assistance robot to execute a motion of supplying food of a corresponding menu.

12. The apparatus for controlling a meal assistance robot according to claim 11, wherein the first biosignal, the second biosignal and the third biosignal are different types of electroencephalogram (EEG) signals acquired through one EEG measuring sensor.

13. The apparatus for controlling a meal assistance robot according to claim 11, wherein the processing unit receives the inputs of biosignals from the user having recognized the meal assistance robot, and acquires the first biosignal indicating the intention to start the operation of the meal assistance robot from among the input biosignals, and
operates the meal assistance robot in response to the first biosignal and waits for the user's menu selection.

14. The apparatus for controlling a meal assistance robot according to claim 11, wherein the first biosignal is at least one of an intended blink signal acquired through an EEG measuring sensor, a voice signal acquired through a microphone, or a motion or gesture signal acquired through a camera.

15. The apparatus for controlling a meal assistance robot according to claim 11, wherein the processing unit differently sets a signal cycle for each of the plurality of menus,
applies a control signal to each of the visual signal generating circuit devices corresponding to the plurality of menus according to the set signal cycles to provide the user with the visual stimulation of differently set signal cycles,
receives the inputs of biosignals from the user having recognized visual stimulation corresponding to any one of the plurality of menus, and acquires the second biosignal evoked by the visual stimulation from among the input biosignals, and
identifies a menu selected by the user using a synchronized signal cycle included in the second biosignal.

16. The apparatus for controlling a meal assistance robot according to claim 11, wherein the second biosignal is a steady state visually evoked potential (SSVEP) signal acquired through an EEG measuring sensor, and includes a signal cycle set for any one object selected by the user from the plurality of objects and a signal cycle synchronized through visual recognition.

17. The apparatus for controlling a meal assistance robot according to claim 11, wherein the plurality of visual signal generating circuit devices is provided in a container containing the plurality of menus and allocated to indicate the corresponding menu, and
the plurality of visual signal generating circuit devices generates the visual stimulation according to the differently set signal cycles through the allocated signal devices to induce visual recognition of the user.

18. The apparatus for controlling a meal assistance robot according to claim 11, wherein the plurality of visual signal generating circuit devices is provided in an augmented reality (AR) device or a mixed reality (MR) device and allocated corresponding to the plurality of menus, and
the plurality of visual signal generating circuit devices generates the visual stimulation according to the differently set signal cycles through the allocated signal devices and provides the user with a real menu and augmented reality or mixed reality together to induce visual recognition.

19. The apparatus for controlling a meal assistance robot according to claim 11, wherein the processing unit acquires the third biosignal corresponding to the virtual food supply motion for the identified menu from among the biosignals inputted from the user, and
controls the meal assistance robot to execute a real food supply motion for the identified menu in response to the third signal.

20. The apparatus for controlling a meal assistance robot according to claim 11, wherein the third biosignal is a motor imagery signal indicating a physical motion acquired through an EEG measuring sensor.

* * * * *